United States Patent
Kataki et al.

(10) Patent No.: US 10,528,427 B1
(45) Date of Patent: Jan. 7, 2020

(54) SELF-HEALING SYSTEM FOR DISTRIBUTED SERVICES AND APPLICATIONS

(71) Applicant: INTUIT INC., Mountain View, CA (US)

(72) Inventors: Debajit Kataki, Bangalore (IN); Aravind Gv, Bangalore (IN)

(73) Assignee: INTUIT, INC., Mountain View, CA (US)

( * ) Notice: Subject to any disclaimer, the term of this patent is extended or adjusted under 35 U.S.C. 154(b) by 91 days.

(21) Appl. No.: 15/177,841

(22) Filed: Jun. 9, 2016

(51) Int. Cl.
- *G06F 11/00* (2006.01)
- *G06F 11/14* (2006.01)
- *H04L 29/08* (2006.01)
- *H04L 12/24* (2006.01)

(52) U.S. Cl.
CPC ...... *G06F 11/1438* (2013.01); *H04L 41/0668* (2013.01); *H04L 67/10* (2013.01); *G06F 2201/805* (2013.01)

(58) Field of Classification Search
CPC ............. G06F 11/1438; G06F 11/1402; G06F 11/1441; H04L 41/0668
See application file for complete search history.

(56) References Cited

U.S. PATENT DOCUMENTS

| | | | | |
|---|---|---|---|---|
| 6,718,486 B1* | 4/2004 | Roselli | ............... | G06F 11/1438 714/41 |
| 6,883,170 B1* | 4/2005 | Garcia | ............... | G06F 11/1438 707/999.001 |
| 8,621,260 B1* | 12/2013 | Sontakke | ............ | G06F 11/1438 714/3 |
| 2003/0036886 A1* | 2/2003 | Stone | .................. | G06F 11/0715 702/188 |
| 2005/0172162 A1* | 8/2005 | Takahashi | ........... | G06F 11/0709 714/4.4 |
| 2005/0257090 A1* | 11/2005 | Santos | ................ | G06F 11/1438 714/35 |
| 2011/0041009 A1* | 2/2011 | Hom | .................... | G06F 11/0715 714/23 |
| 2013/0042139 A1* | 2/2013 | Bhalerao | ............. | G06F 11/0709 714/2 |
| 2015/0378743 A1* | 12/2015 | Zellermayer | ......... | G06F 9/4401 713/2 |

* cited by examiner

*Primary Examiner* — Philip Guyton (74) *Attorney, Agent, or Firm* — Patterson + Sheridan, LLP (57) ABSTRACT

A self-healing system configured to automatically restore non-responsive or failed applications to a normal operating state. A self-healing system may restart an application after confirming that the application itself has failed—and not an underlying dependency failure. The self-healing system may also evaluate a server hosting an application reported as being non-responsive to determine whether that server has itself failed. If an application is non-responsive or has failed on an otherwise healthy host, and the dependent service use by the application are available, the self-healing system automatically restores the application to a responsive state. To do so, the self-healing system may generate a run list specifying a sequence of scripts invoked to restore the application to the responsive state.

22 Claims, 7 Drawing Sheets

SELF-HEALING SYSTEM FOR DISTRIBUTED SERVICES AND APPLICATIONS

FIELD

The present disclosure is directed to techniques for monitoring and restoring computer software applications. More specifically, embodiments presented herein provide techniques for automatically restoring failed software components included as part of distributed applications and computing services.

DESCRIPTION OF RELATED ART

Enterprises frequently use a variety of interdependent applications and systems to offer an offer online service. For example, software applications used to prepare and file income tax returns are frequently offered as an online service. In addition to generating tax return documents, such an online service typically guides a user through a collection of complex interactive workflows in order to prepare a complete, valid income tax return. Other online services allow users to access software applications used to prepare a variety of other legal and formal documents. For example, online services are available which direct a user through a guided interaction to generate estate planning documents, corporate entity documents, legal filings, etc. Still other complex software applications accessed as an online service include financial service applications which allow users to complete mortgage applications or apply for home, life, or automobile insurance, or provide users with access to enterprise applications or data.

While often presented to end users as a single unified application, such services are frequently hosted on clusters of computing systems with different servers running different components of an application or service stack. For example, an enterprise use a collection of web servers, application servers and database systems running on independent host clusters to offer an online service. Further, for reasons of availability, redundancy, and scalability, instances of the software applications used to provide an online service are commonly launched on many hosts in parallel at different data center locations. The individual applications and systems underlying an online service can fail for a variety of reasons. While a production service is typically deployed with fault tolerance in mind, in some cases, a failed application can degrade the usability of the overall service. Even for a resilient service, however, when an application fails, a system engineer typically has to evaluate what has happened in order to determine a necessary set of actions to restore an application to a functioning state. Some monitoring systems can report whether an application used in providing a service is running, but when an error state is reported, different actions may be needed to restore an application on a host depending on what caused that application to fail. Further, such monitoring systems can be unreliable in that they report a host is alive (e.g., using port knocking) when an application on that host itself has crashed.

SUMMARY

One embodiment presented herein includes a method for restoring a non-responsive application executing on a server computing system. This method may generally include selecting a first instance of the application hosted on a first server, where the first application has been identified as being in a non-responsive state. This method may also include determining whether each of one or more dependent computing services required by the instance of the application is available. Upon determining that each of the one or more dependent computing services required by the instance of the application is available, the method includes determining whether the first server is available. Upon determining that the first server is available, the first instance of the application hosted on the first server is restarted.

In a particular embodiment, restarting the first instance of the application includes generating a run list. The run list specifies a sequence of scripts invoked to restore the first instance of the application to a responsive state. Each script in then invoked according to the sequence specified by the run list. Further, each script may be invoked to start, stop, or restart either the first instance of the application or one of the one or more dependent computing services.

Still another embodiment includes method for restoring a non-responsive application. This method may generally include determining a health status of the application and determining a health status for at least a first dependent computing service required by the application. Upon determining the health status of either the application or the first dependent computing service indicates a non-responsive status, a health status for a first server hosting the application and a second server hosting the first dependent computing service is determined. Upon determining the health status of the first server and the second server indicates the first server and the second server are available, initiating a restoration process to restore the first application to a responsive state.

Additional embodiments include a system having a processor and a memory storing one or more application programs configured to perform the methods disclosed herein and a computer-readable storage medium storing instructions, which when executed on a processor perform the methods disclosed herein.

BRIEF DESCRIPTION OF THE DRAWINGS

Various embodiments in accordance with the present disclosure will be described with reference to the drawings, in which.

DETAILED DESCRIPTION

Embodiments presented herein provide techniques for detecting that an application has become non-responsive, unreachable, or otherwise in an error state. Further, embodiments presented herein provide a self-healing system which can automatically restore a non-responsive or failed application to a normal operating state, including restoring and restarting, as needed, any upstream or downstream applications associated with the non-responsive application. For example, in some cases, an application could become unresponsive due to an underlying service crashing (e.g., a database system or application server hosting the application crashing). In such case, the self-healing system would stop the application, restart the underlying service (e.g., restart a crashed database), and restart the failed application. In other cases, after confirming that any underlying dependencies are available, and that the server hosting the application has not failed, the self-healing system can restart the failed application on the server. Additionally, if any other applications or systems depended on the availability of the failed application, such applications could be stopped or restarted as well.

Embodiments presented herein provide techniques for detecting that an application has become non-responsive, unreachable, or otherwise in an error state. Further, embodiments presented herein provide a self-healing system which can automatically restore a non-responsive or failed application to a normal operating state, including restoring and restarting, as needed, any upstream or downstream applications associated with the non-responsive application. For example, in some cases, an application could become unresponsive due to an underlying service crashing (e.g., a database system or application server hosting the application crashing). In such case, the self-healing system would stop the application, restart the underlying service (e.g., restart a crashed database), and restart the failed application. In other cases, after confirming that any underlying dependencies are available, and that the server hosting the application has not failed, the self-healing system can restart the failed application on the server. Additionally, if any other applications or systems depended on the availability of the failed application, such applications could be stopped or restarted as well.

The actions performed to restart a given application or service, and the dependencies for an application, may be specified in scripts used to start, stop, or restart instances of the application and associated services. Further, the self-healing system may maintain (or access) data indicating which hosts should be running a given application. Thus, the self-healing system can monitor individual hosts for the applications that should be available and automatically heal an application on a system when an application fails or becomes unresponsive, without requiring significant manual intervention by a system engineer.

In one embodiment, the self-healing system may restart an application after confirming that it is the application itself that has failed—and not an underlying dependency failure. The self-healing system may also evaluate a server hosting an application reported as being unavailable to determine whether the server is in maintenance mode. That is, the self-healing system confirms that the application has not be taken offline or stopped intentionally. Provided the server hosting an application is not in maintenance mode, the self-healing system determines whether the server itself has failed (e.g., due to a lost network connection with the server) or the application itself has failed. If the application has failed on an otherwise healthy host, the self-healing system automatically restores the application by confirming that any underlying systems used by the application (e.g., a connection to a database on another host) are running (or restored) and then restarting the application. Thus, the self-healing system described herein may distinguish between causes of application unavailability due to the application itself failing and failures in the server hosting the application (or failures in other systems).

As noted, information used to restore a given application (and any service dependencies) may be stored in scripts specifying a sequence of instructions to stop, start, or restart, a given application or dependent service. Additionally, a service profile may indicate any dependences of a given application, and a host inventory may indicate what server systems are running a given application (and dependent applications).

In the appropriate case, the self-healing system triggers an auto-restoration process to rapidly bring an application on a host server back in service. Importantly, the restoration process can restart any underlying dependencies (such as database or web servers) used by the application as well as the application itself without requiring manual intervention from a system engineer. The self-healing system may prompt a system engineer before initiating the restoration process (e.g., before accessing applications on a production system). However, the self-healing system could also initiate the restoration process automatically. For example, a large enterprise may use the self-healing system to restore applications in a test or development environments or for to restore distributed applications that do not provide a public facing service to customers. Doing so may reduce the need for system engineers to spend time evaluating a failed application related to a non-production application.

In one embodiment, to heal a non-responsive application, the restoration service identifies upstream and downstream dependencies associated with the non-responsive application, i.e., services that need to be restored prior to (or after) the restoration of the unresponsive application. The upstream and downstream dependencies may be identified from a service profile associated with the application. Doing so allows the restoration service to control the sequence in which services are restored and to safely restore the application. Further, the restoration service generates, based on the sequence and service profile, a run list, which is then used to restore the unresponsive application. Generally, the run list specifies a sequence of scripts invoked to confirm that any underlying services needed by the application are available (or to restore such services), scripts needed to restart the application itself, and scripts used to stop and restart any services which rely on the availability of the unresponsive application while it is being restored. The restoration service then executes the scripts according to the run list.

Note, embodiments of the disclosure are described herein using an online service and hosted using an application stack which includes a web server, application server, and database systems. Of course, one of ordinary skill in the art will recognize that the self-healing system described herein may readily be adapted to restore software applications, online services or web services built using a variety of application stacks, servers, containers, or frameworks etc., as well as applications running on virtualized computing infrastructure, e.g., using a collection of virtual machines (VMs) launched using a cloud computing platform or service.

Figure 1:
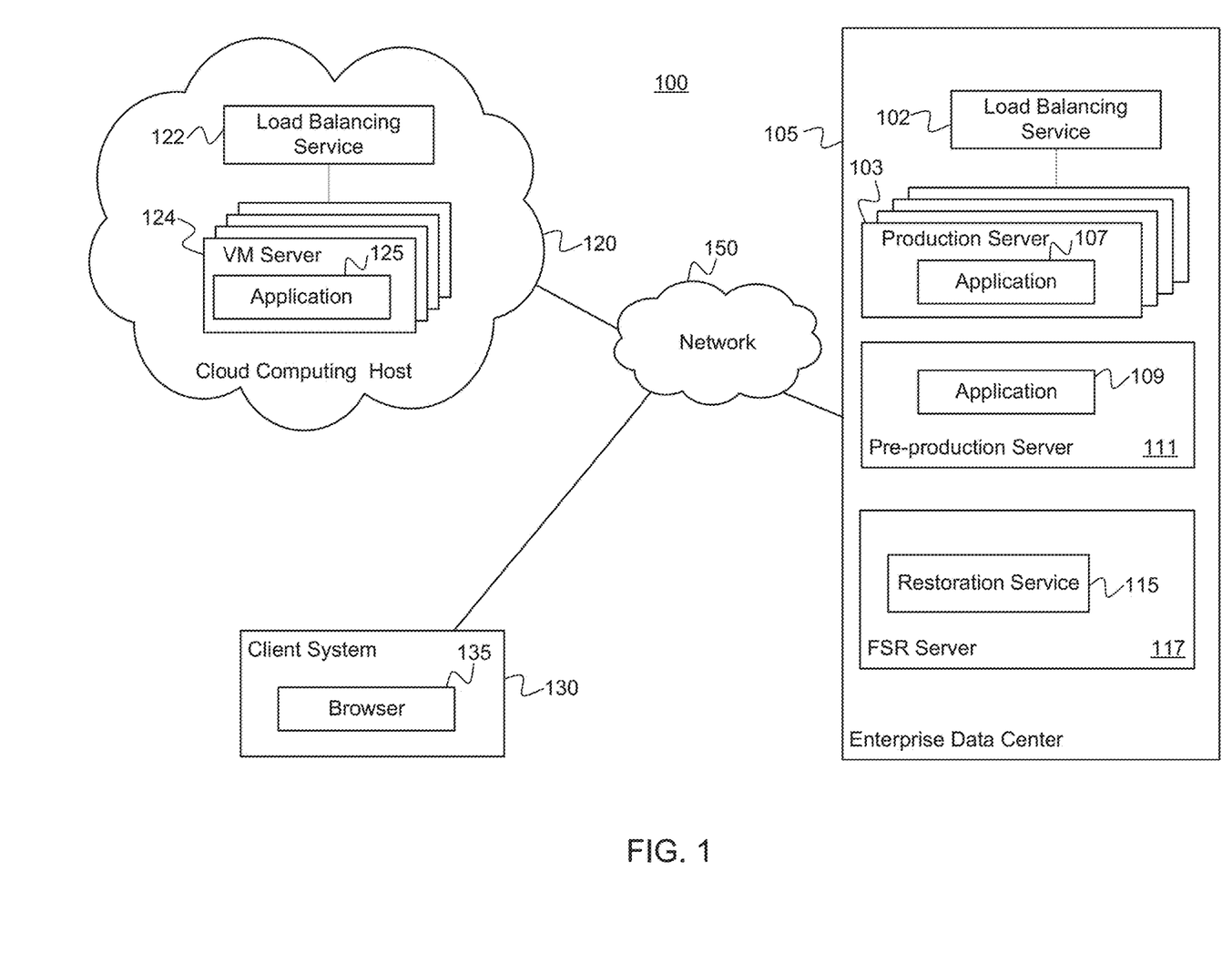
FIG. 1 illustrates an example of a computing environment which includes a restoration service used to monitor and restore distributed services and applications running on a variety of computing systems, according to one embodiment.

FIG. 1 illustrates an example of a computing environment 100 which includes a self-healing system for distributed services and applications, according to one embodiment. As shown, the computing environment 100 includes an enterprise data center 105, a cloud computing host 120, and client system 130, each connected to a public network 150 (e.g., the internet).

Illustratively, the cloud computing host 120 includes a set of VM servers 124, each running an instance of an application 125. And the enterprise data center 105 includes a set of production servers 103 each running an instance of an application 107. The enterprise data center 105 also includes a preproduction server 111 and a faster service restoration (FSR) server 117. Load balancing service 102 distributes sessions to instances of the application 107 on the production servers 103 in the enterprise data center 105. Similarly, a load balancing service 122 distributes sessions to instances of the application 125 on the VM servers 124 in the cloud computing host 120. In this example, assume the application 107 provides an online service (e.g., an online tax preparation service) accessed by a web browser 135 on a client system 130.

Similarly, assume the application 125 provides an instance of the online service hosted by one of the VM servers 124 on the cloud computing host 120. Hosting instances of the application 125 on the cloud computing host 120 could allow the enterprise to scale service capacity in response to seasonal demand for the service. The preproduction server 111 could host new or updated versions of the application 109 in a test or staging environment. Alternatively, preproduction server 111 could be part of a continuous deployment of the online service, where application 109 provides an update to a component of the online service evaluated using a sequence of deployment tests before being exposed to production traffic.

In one embodiment, the restoration service 115 may be configured to monitor and restore a failed instance of application 107 on a production server 103, a failed instance of application 109 on the preproduction server 111, or a failed in of the application 125 on a VM server 124. For example, the restoration service 115 may include a console application that determines a current status of an application on each server running an instance of the application. In one embodiment, the restoration service 115 may access a host inventory used to maintain a record of each server and a service profile identifying which host servers (e.g., which production servers 103, VM servers 124, or preproduction servers 111) should be running an instance of a given application.

When the restoration service 115 determines that an application 107 on a production server 103 appears to be unavailable, the restoration service 115 may determine whether the application 107 (or the particular server 103 hosting the application 107) is identified as being in maintenance mode or is otherwise intentionally out of service. If so, the restoration service 115 does not take any action to restore the application 107.

Otherwise, the restoration service 115 may attempt to restore the failed application 107 on the particular production server 103. In one embodiment, to restore the application 107, the restoration service 115 first determines whether services or other dependencies required by the application 107 have failed or otherwise become unavailable or inaccessible. To do so, the restoration service 115 may parse a service profile associated with application 107 to identify dependent services or applications required by application 107. Server hosts which provide any such dependent services or applications may be specified in a host inventory. For example, assume a production service implemented generally using a web server, an application server hosting application 107, and a database. In such a case, the restoration service 115 could determine whether the underlying database system or web server associated with an instance of the application 107 are operating and available. If not, the restoration service 115 may restore the application 107 by first stopping the application 107, restarting the underlying database or web server, and then restarting application 107.

However, if the underlying services needed by application 107 are operating properly, then the restoration service 115 may determine if the production server 103 hosting the application 107 has itself failed or appears to be non-responsive. To determine whether the production server 103 is available, the restoration service 115 may use a variety of utilities (e.g., ping, SSH, etc.) to contact production server 103. Further, if a connection is established with the relevant production server 103 (e.g., an SSH shell session), the restoration service 115 could also check CPU or memory utilization (or other performance metrics) or attempt to mount a storage volume to determine a status for the server 103.

If application 107 is unavailable because server 103 hosting the application 107 has failed or become unavailable, the restoration service 115 does not attempt to restore the application on the non-functioning server. Instead, in one embodiment, the restoration service 115 may generate a message or submit a ticket to a support service at the enterprise responsible for maintaining server availability.

Otherwise, where the services needed by application 107 are available and the server 103 hosting application 107 appears to be operating within normal parameters, the restoration service 115 may initiate a restoration process to restore the application 107. Such a process may include stopping any services which depend on the application 107, halting (or killing) any running process which actually provides application 107, and restarting the application 107. In one embodiment, the set of actions performed to restore the service may be reflected in a run list generated by the restoration service 115. The run list itself may specify a sequence of scripts to invoke to restore the application 107. The restoration service 115 may generate the run list by identifying any upstream or downstream services associated with the failed application, what servers are hosting any such dependencies, and scripts used to stop, start, and restart the application 107 (and any upstream or downstream services associated with the application 107). Once generated, the restoration service 115 restores the failed application 107 by invoking each script in the run list. Note, if unable to restore the service, the restoration service 115 may notify a system engineer indicating the service 115 was unable to restore a failed application 107.

In one embodiment, the restoration service 115 may follow the same general process discussed above for restoring a non-responsive application 107 on a production server 103 in order to restore an application 125 on a VM server 124 or to restore an instance the application 109 on the preproduction server 111. In some cases, the restoration service 115 may automatically attempt to restore a failed application after a status check identifies the application as having failed or becoming non-responsive. Alternatively, the restoration 115 service may prompt for approval to restore an application prior to making an attempt to do so. For example, the restoration service 115 could notify a system engineer or other administrator before starting, stopping, or restarting an application 107 on a production server 103 (or stopping or restarting a dependent service in production use). In contrast, the restoration service 115 could attempt to restore application 109 on preproduction server 111 without requesting approval from a system engineer. In other cases, the restoration service 115 could be instructed to restore an application by the system engineer. Of course, in practice, which applications require some form of approval before a restoration attempt is made and which applications the restoration service 115 attempts to restore without prompting for administrator approval may be tailored as a matter of preference.

Client system 130 is included to be representative of a general purpose computing system, such as a desktop or laptop computer hosting applications used to access a production computing service (e.g., browser 135) as well as mobile devices, such as mobile telephones and computing tablets.

Figure 2:
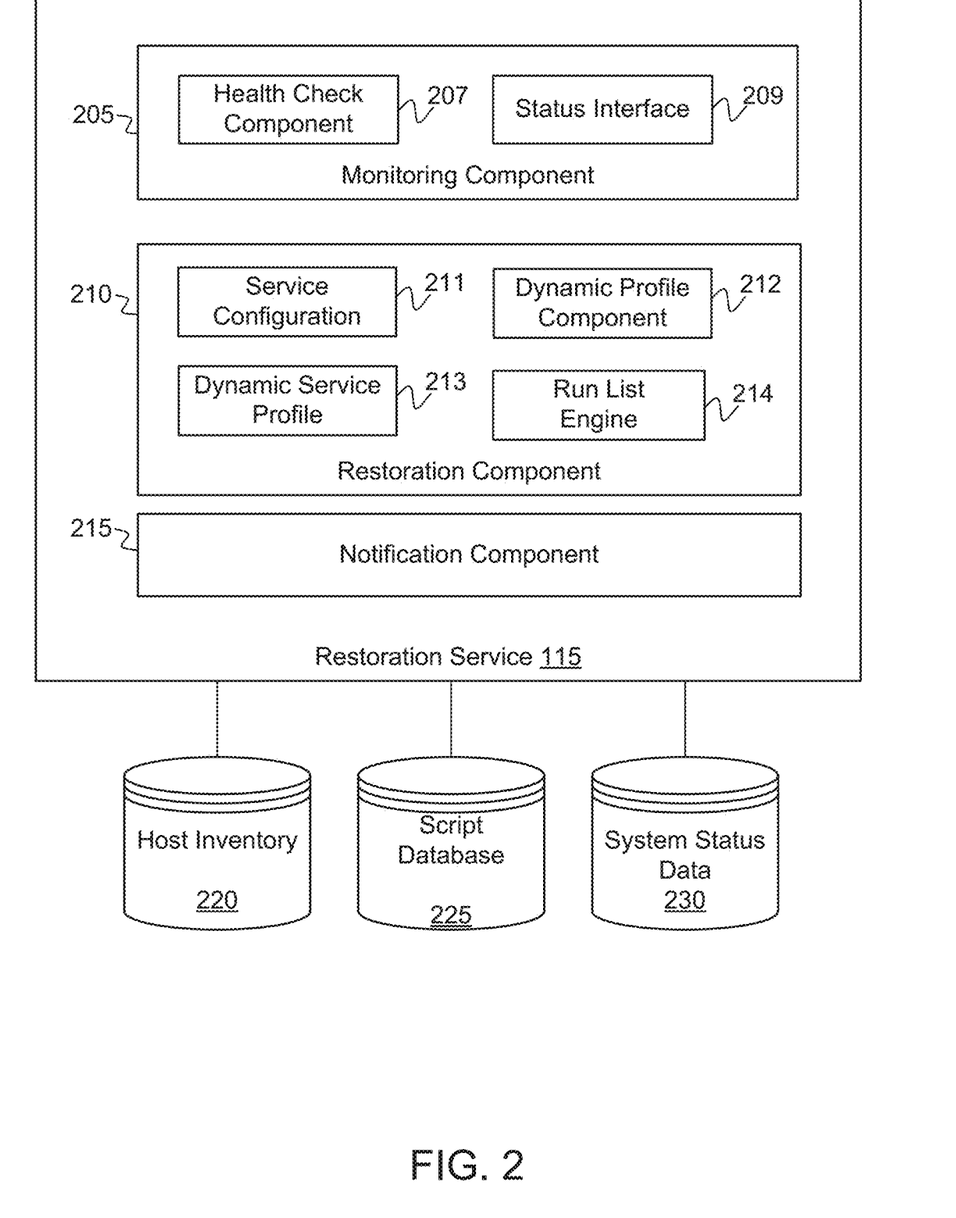
FIG. 2 further illustrates components of the restoration service first introduced in FIG. 1, according to one embodiment.

FIG. 2 further illustrates components of the restoration service 115 first introduced in FIG. 1, according to one embodiment. As shown, the restoration service 115 includes a monitoring component 205, a restoration component 210, and a notification component 215. Illustratively, the monitoring component 205 includes a health check component 207 and a status interface 209. The health check component 207 generally provides one or more software applications used to determine a "health status" of a given application or host server. For example, the health check component 207 may attempt to access an application using a test script configured to exercise features of the application to determine whether the application responds to requests as expected (and within expected response times). The health check component 207 may also determine whether any upstream or downstream services associated with an application are available, as well as determine whether a server hosting a given application has failed or become inaccessible or non-responsive. For example, the health check component 207 could determine whether a given server is "alive" by sending ICMP messages (i.e., a ping message) using an IP address of the server stored in host inventory 220 or create a shell connection (e.g., an SSH session) with a given host.

The resulting status may be stored in system status data 230. In addition, the restoration service 115 may provide a status interface 209. For example, the status interface 209 may present a system engineer (or other administrator) a list of servers (e.g., by host name or IP address), the applications expected to be running on each listed server, and an indication whether each application is believed to be running as expected or having failed, malfunctioned (e.g., experiencing latencies above a threshold), or otherwise being unavailable or inaccessible. Further, the system engineer may use the status interface 209 to select a failed or non-responsive application which the restoration service 115 should attempt to restore.

The restoration component 210 generally provides one or more software applications used to perform the restoration process discussed above relative to FIG. 1. As shown, the restoration component 210 includes a dynamic profile component 212 and a run list engine 214. In one embodiment, the dynamic profile component 212 may be configured to generate a run list used to attempt to restore a non-responsive application. To do so, the dynamic profile component 212 may select a non-responsive application and associated host server based on the system status data 230 (e.g., an application 107 running on one of the production servers 103). Once selected, the dynamic profile component 212 may parse a service configuration 211 for the non-responsive application to identify any upstream or downstream dependencies associated with the non-responsive application. Once identified, dynamic profile component 212 may generate dynamic service profile 213 indicating servers which host a given instance of an upstream or downstream dependency listed in the service configuration 211 (as identified from the host inventory 220). That is, the service profile 213 may specify any applications or services required by the non-responsive application, along with an indication of servers (e.g., by IP address) that provide each required application or service to the non-responsive application. Similarly, the service profile 213 may also specify any applications or services which rely on the availability of the non-responsive application, along with an indication of servers (e.g., by IP address) that host such applications or services. The dynamic profile component 212 may also identify scripts used to start, stop, or restart, the non-responsive application and scripts used to start, stop, or restart any upstream or downstream application or service identified in the service profile 213.

The scripts may be stored in a database 225. Once the appropriate applications, hosting servers, and scripts have been identified in the service profile 213, the dynamic profile component 212 generates a run list identifying a sequence of scripts to invoke relative to the applications and hosts associated with the non-responsive application. And in turn, the run list engine 214 may invoke each script in the run list and reports on the results. For example, the run list engine 214 may update system status data 230 after stopping, starting, or restarting a given application or service.

To build a run list, the dynamic profile component 212 may parse the dynamic service profile 213 to identify any upstream or downstream services associated with the application being restored, identify servers hosting such dependencies, and scripts used to stop, start, and restart any such service and dependencies. Once identified, the dynamic profile component 212 may determine a sequence of phases to carry out the restoration. For instance, the dynamic profile component 212 may assign, to a first phase, services that have no underlying dependencies. The dynamic profile component 212 adds instructions to the run list to confirm the availability or restart each such service as part of the first phase. The dynamic profile component 212 may assign, to a second phase (and subsequent phases), any services having dependencies on the services associated with the first (or prior) phase. The dynamic profile component 212 adds steps to the run list to confirm the availability of services associated with each phase. In one embodiment, scripts in the run list assigned to a given phase may be invoked in parallel.

The dynamic profile component 212 may add steps to the run list which stop (or halt) any services which rely on the on the unresponsive application. Doing so creates an environment which any service needed by the unresponsive application is available and any service which relies on the unresponsive application is quiesced or stopped until the non-application is restored. The dynamic profile component 212 adds steps to the run list that clean up the non-responsive application and restore the non-responsive application to a healthy state. For example, the dynamic profile component 212 may add scripts to the run list which clean up any open transactions or other artifacts left by the failed application along with scripts to kill any remaining processes associated with the non-responsive application. The dynamic profile component 212 may also include scripts in the run list which restart the non-responsive application and restart any quiesced or stopped upstream services. Once complete, the run list engine 214 may restore the non-responsive application by performing each action or invoking each script, in order, as specified in the run list.

The notification component 215 generally provides one or more software applications configured to notify a system engineer (or other administrator) regarding the status of an application. Should any action specified in the run list fail or should any script fail to complete successfully, the notification component 215 may generate messages to notify system engineers or other personnel that the restoration service 115 was unable to restore an unresponsive application. For example, the notification component 215 could open a ticket with a support system after the monitoring component 205 determines that a given host server has failed (or is otherwise non-responsive) and therefore, the restoration service 115 cannot restore an application on that host server. The notification component 215 could also messages requesting permission to initiate the self-healing process for a given application.

Figure 3:
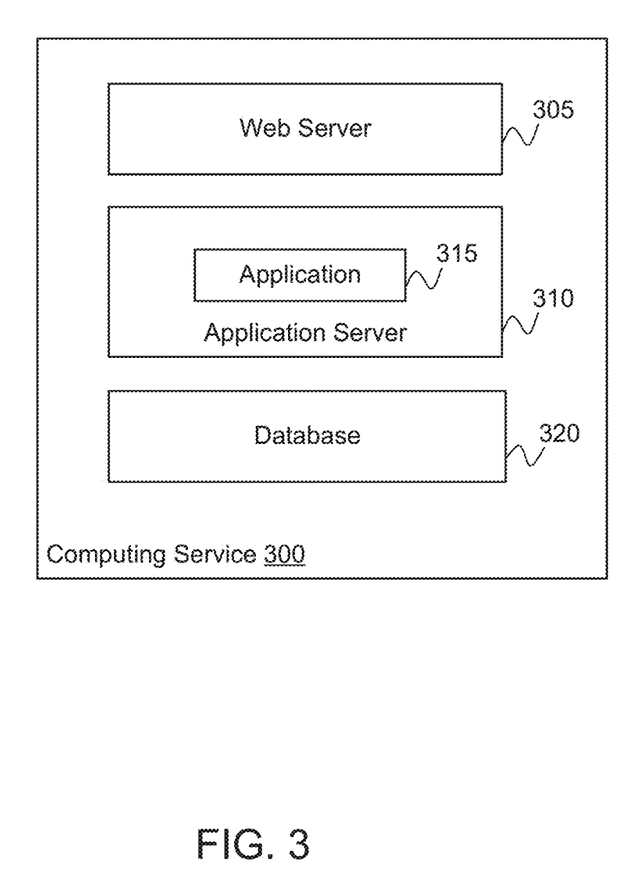
FIG. 3 illustrates an example of a computing service composed from an application stack deployed to a host server, according to one embodiment.

FIG. 3 illustrates an example of a computing service 300 composed from an application stack, according to one embodiment. In this example, the computing service 300 is generally modeled as a web server 305, an application server 310, and a database 320. Of course, other software architectures or distributed application frameworks could be used.

Continuing with the example of a tax preparation service, the application 315 may include applications components and services which are used to guide a user in preparing a tax return and to access related features and services, e.g., to file a completed tax return or to interact with help content. In one embodiment, the application 315 may receive requests for content from web server 305. In response, application 315 may generate HTML components (e.g., forms, text fields, and so on, along with scripts or applets) passed back to a client system 130 by the web server 305, which are then rendered as a web page by the browser 135. Generally, the application 315 may be implemented using any suitable software programming language, application framework, web service solution stack, virtual application containers, etc., in order to present application features and content to a user. In addition, the application 315 may read and write data to database 320 (e.g., the data associated with a given user's tax return).

As described above, the restoration service 115 may periodically evaluate application 315 to determine a current "health" status of the application 315. That is, the restoration service may periodically determine whether application 315 is available and responding as expected or has failed or become non-responsive. Should application 315 become non-responsive, then the restoration service 115 may evaluate the web server 305 and database 320 to determine whether the application 315 has become non-responsive due to a failed dependency. If not, the restoration service may stop application 315, restart the underlying services (web server 305 and database 320) and restart application 315. If the web server 305 and database 320 are functioning as expected, the restoration service 115 may determine whether the server hosting application server 3130 (and application 315) is itself responsive. Provided the supporting applications are available (i.e., web server 305 and database 320) and the server hosting application 315 is available, the restoration service 115 generates a run list specifying a set of scripts invoked to automatically restore application 315 to an expected operating state.

Figure 4:
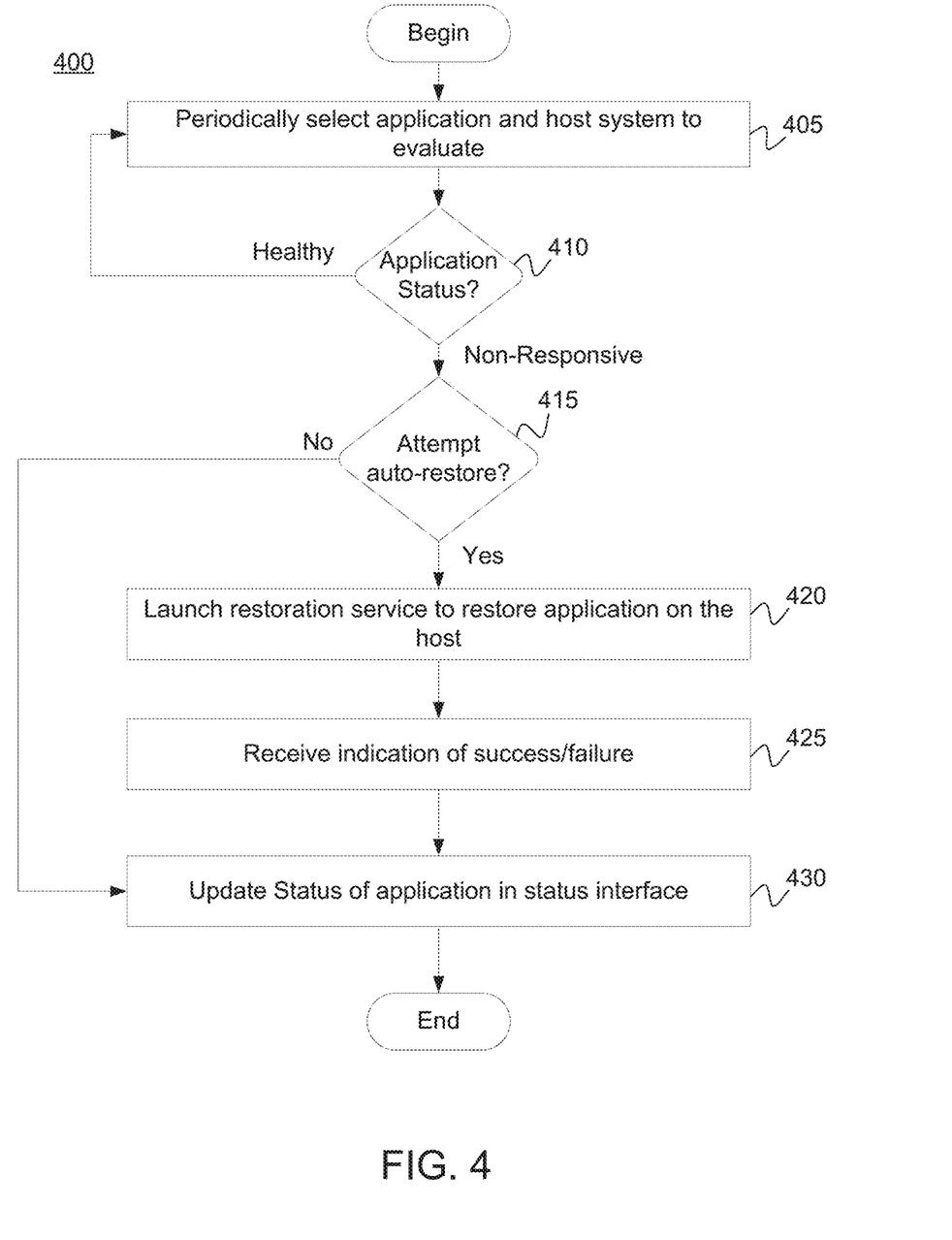
FIG. 4 illustrates a method for monitoring and restoring distributed services and applications, such as the service illustrated in FIG. 3, according to one embodiment.

For example, FIG. 4 illustrates a method 400 for monitoring and restoring distributed services and applications, such as the service illustrated in FIG. 3, according to one embodiment. As shown, the method 400 begins at step 405 where the health check component 207 of the restoration service 115 selects an application to evaluate. For example, the restoration service 115 may periodically verify the availability of applications 107 running on production servers 103, or application 125 running on VM servers 124, or application 109 on a preproduction server 111. To do so, the health check component 207 may attempt to perform a test transaction against the application. That is, the health check component 207 may determine whether the application is healthy by attempting to use the application for its intended purpose and evaluating the results of a test transaction. In other cases, the health check component may invoke a script used to evaluate performance metrics or log data associated with the application. For example, the health check component 207. In still other cases, the health check component 207 could respond to notifications or log data for other applications indicating that the application was unreachable or unavailable (at least to such other applications).

If the application selected at step 405 is running as expected, the health check component 207 may refresh the corresponding status in system status data 230 and return to step 405 (and select another application to evaluate). Otherwise, when the health check component 207 identifies a failed or non-responsive application, the restoration service 115 determines whether to automatically attempt to restore the failed application (step 415). For example, the system status data 230 may indicate that the restoration service 115 should automatically restore the non-responsive application or to first initiate an approval work flow. If the restoration service 115 does not attempt to restore the non-responsive application, then the method 400 proceeds to step 430, where the restoration service 115 updates the status of the application selected at step 405 to reflect it being in a non-responsive or failed state. Additionally, the restoration service 115 may update a status interface 209 to highlight the non-responsive application. Further, in one embodiment, the restoration service 115 may generate a notification sent to a system engineer requesting an approval to initiate the restoration process for the non-responsive application (or otherwise initiate an approval workflow).

Returning to step 415, if the restoration service 115 determines to automatically restore the non-responsive application, then restoration service 115 launches the dynamic profile component 212, which builds a run list executed by run list engine 214 (step 420). After executing the run list, the restoration service 115 may also determine whether the non-responsive application was successfully restored (step 425) and update the status of the application (step 430).

Figure 5:
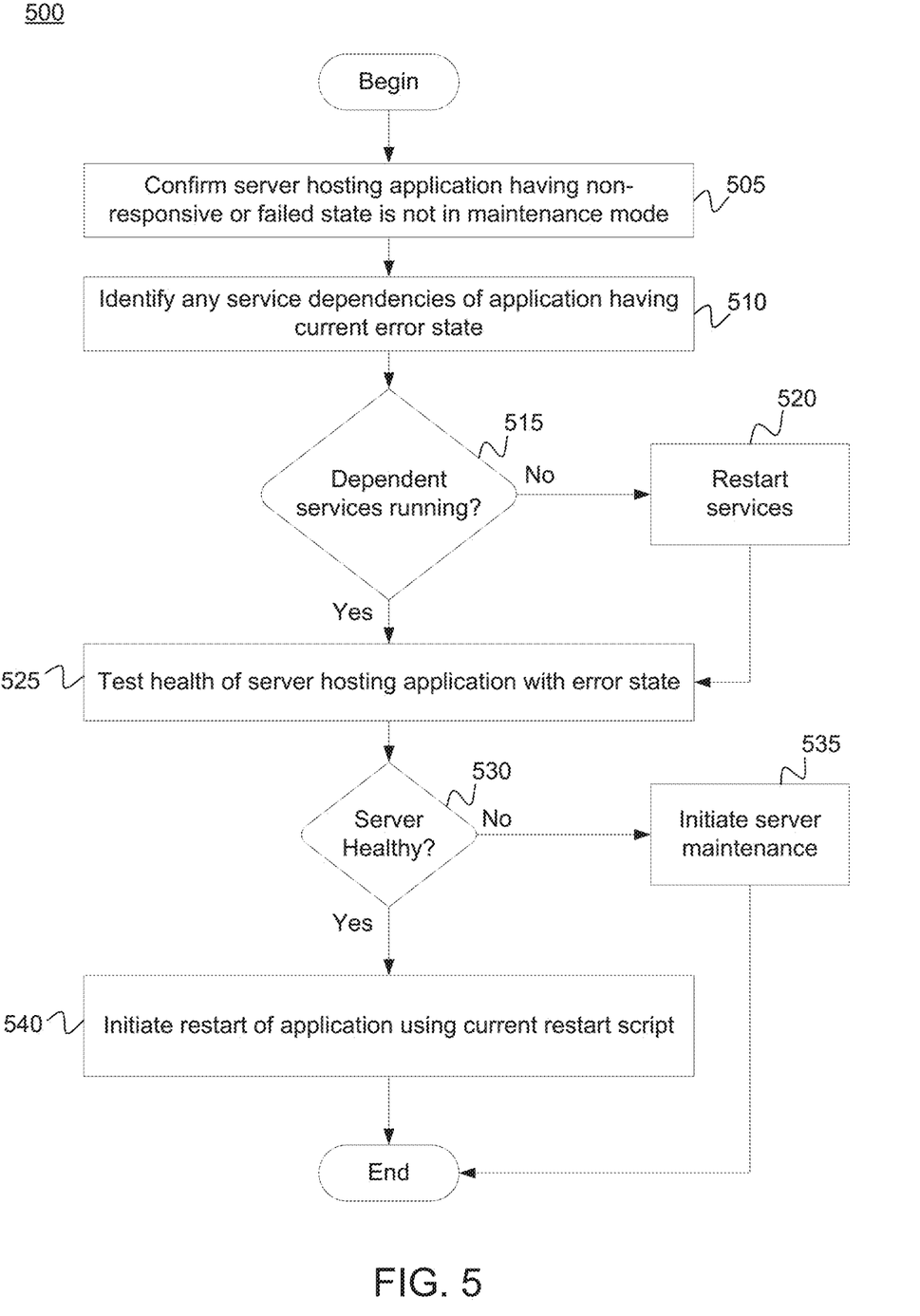
FIG. 5 illustrates a method to automatically restore an application on a computing host, according to one embodiment.

FIG. 5 illustrates a method 500 to automatically restore an application on a computing host, according to one embodiment. As shown, the method 500 begins at step 505 where the restoration service 115 confirms that the non-responsive application (or server hosting the non-responsive application) is not identified as being in maintenance mode. For example, the host server may be undergoing an update or updates to the application may be underway.

At step 510, the restoration 115 identifies any service dependencies associated with the non-responsive application. For example, the non-responsive application may be an application hosted on an application server (e.g., the JBoss application server) in conjunction with a web server and a database. In such a case, the restoration service 115 may verify the availability of the web server and database application needed by the non-responsive application. At step 515, if any of the dependent services are not running, then at step 520, the non-responsive application may be stopped and the underlying services restarted (e.g., using scripts included in a run list).

After restarting such services (step 520) or if the dependent services are determined to be available (step 515), the restoration service 115 determines whether the server hosting the non-responsive application is itself operating as expected. As noted above, e.g., the restoration component 115 may use common utilities (e.g., ping) or establish shell connection to the server (e.g., an SSH shell) to determine whether the server itself has failed or otherwise become inaccessible or non-responsive. At step 530, if the server has failed or has become non-responsive, then the restoration service 115 may initiate server maintenance without attempting to restore the non-responsive application on a failed server. Otherwise, at step 540, the non-responsive application may be restarted (e.g., using scripts included in a run list). Further, any service identifying the non-responsive applications may be stopped or restarted as appropriate in a particular case.

Figure 6:
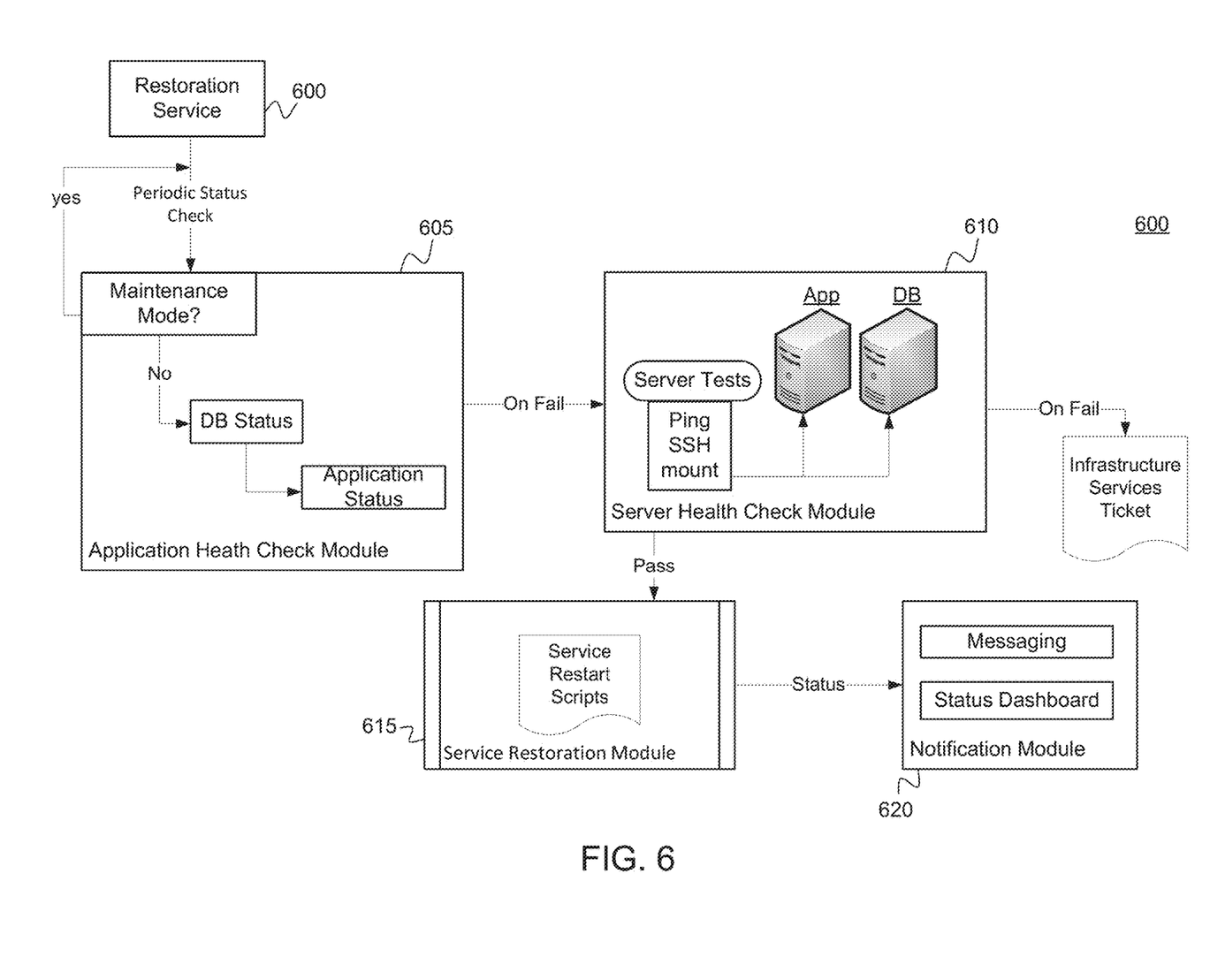
FIG. 6 illustrates an example of the process for a restoration service to evaluate and restore an application according to the methods shown in FIG. 4 and FIG. 5, according to one embodiment.

FIG. 6 illustrates an example of the process for a restoration service 600 to evaluate and restore an application according to the methods shown in FIG. 4 and FIG. 5, according to one embodiment.

As shown in FIG. 6, a restoration service 600 periodically initiates a health check module 605 to run a status check for a given application. First, the health check module 605 determines whether the application (or server hosting the application) is listed as being in maintenance mode. If so, then the health check of the current application ends and another application is evaluated. If the application (or server hosting the application) is not in maintenance mode, then the health check module 605 determines a database status 607 and an application status 609. If either the database status 607 or application status 609 indicates the corresponding application or database has become non-responsive (i.e., the application or database fails the health status check performed by the health check module 605), then a server health check module 610 evaluates a server 612 hosting the application and a server 614 hosting the database.

As shown, tests 611 used to evaluate status of servers 612, 614 may include, among others, sending ping messages, establishing shell sessions, or mounting storage volumes on the servers 612, 614. If server 612 or server 614 fails the server tests 611, server health module 610 may generate a support services ticket 613. That is, the server health module 610 may notify a support service used to restore or evaluate failed server systems.

Otherwise, after confirming the health of the hosting servers, a service restoration module 615 may initiate service restart scripts to restore the application or underling services (e.g., a database or webserver). For example, as noted above, a restoration service 116 may generate a run list specifying a sequence of scripts to invoke to stop, start, and restart, the application services as appropriate to restore the application and/or underlying database. Further, the service restoration module 615 may send a status message to the notification module 620. In turn, the notification module 620 may send messages to a system engineer or update an application status dashboard to indicate whether the application and/or underlying services were successfully restored by the restoration service 600.

Figure 7:
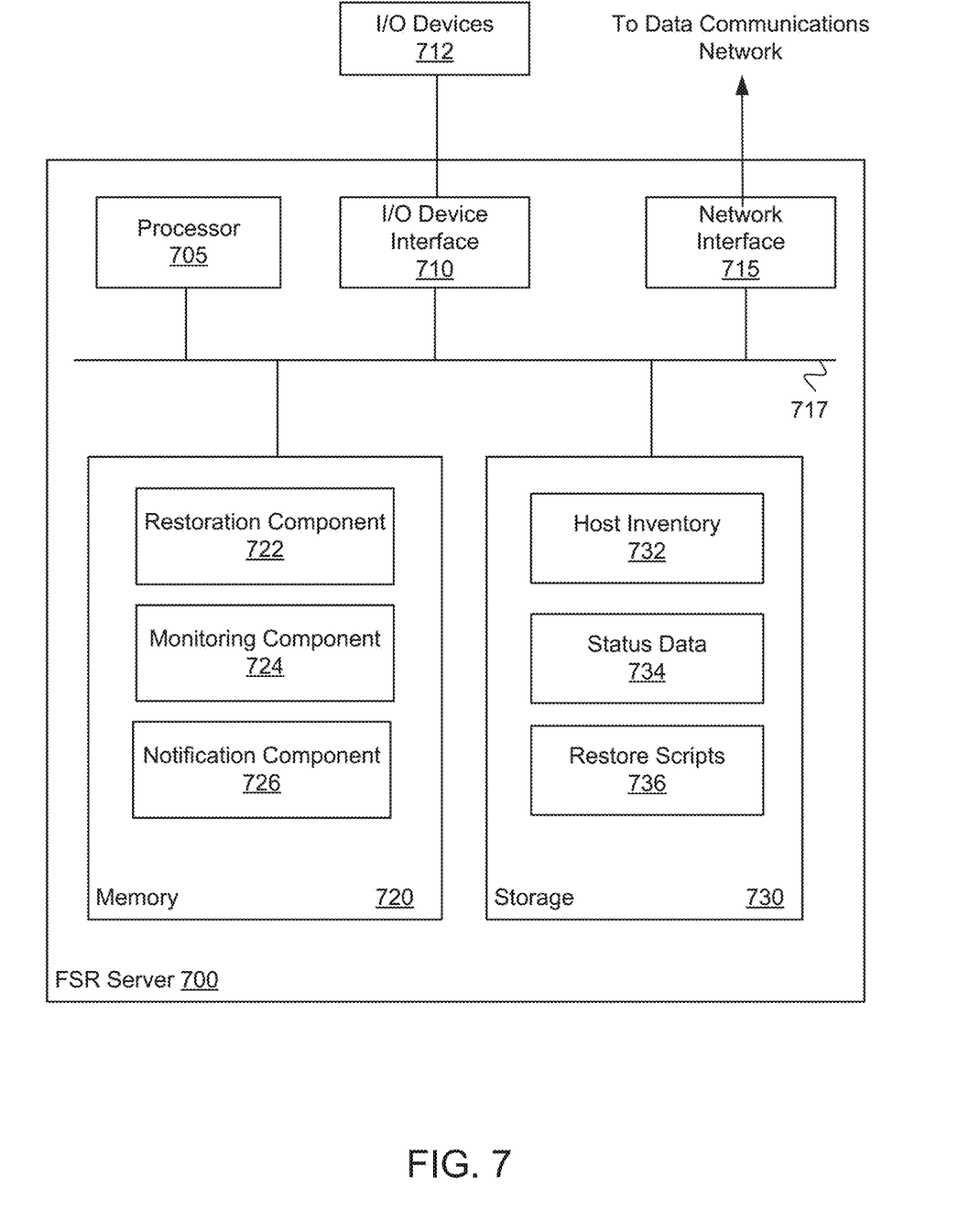
FIG. 7 illustrates an example computing system used to host components of a self-healing system for distributed services and applications, according to one embodiment.

FIG. 7 illustrates an example computing system used to host components of a self-healing system for distributed services and applications, according to one embodiment. As shown, the computing system 700 includes, without limitation, a central processing unit (CPU) 705, a network interface 715, a memory 720, and storage 730, each connected to a bus 717. The computing system 700 may also include an I/O device interface 710 connecting I/O devices 712 (e.g., keyboard, display and mouse devices) to the computing system 700. Further, in context of this disclosure, the computing elements shown in computing system 700 may correspond to a physical computing system (e.g., a system in a data center) or may be a virtual computing instance executing within a computing cloud.

The CPU 705 retrieves and executes programming instructions stored in the memory 720 as well as stored in the storage 730. The bus 717 is used to transmit programming instructions and application data between the CPU 705, I/O device interface 710, storage 730, network interface 715, and memory 720. Note, CPU 705 is included to be representative of a single CPU, multiple CPUs, a single CPU having multiple processing cores, and the like. The memory 720 is generally included to be representative of a random access memory. The storage 730 may be a disk drive or flash storage device. Although shown as a single unit, the storage 730 may be a combination of fixed and/or removable storage devices, such as fixed disc drives, removable memory cards, optical storage, network attached storage (NAS), or a storage area-network (SAN).

Illustratively, the memory 720 includes an a restoration component 722 a monitoring component 724 and a notification component 726. And storage 730 includes a host inventory 732, status data 734, and scripts 736. As described, the restoration component 722 may generally be configured to attempt to restore an application and any upstream or downstream services associated with the application after the application is identified as being in a non-responsive or failed state, e.g., using the service restoration module 615 and the methods 400, 500. The monitoring component 724 may generally be configured to perform a health status check for an application and underlying services (e.g., a database or web server). For example, the monitoring component 724 may include the application health check module 605 and server health check module 610 discussed above relative to FIG. 6.

The notification component 726 may generally be configured to maintain a status interface showing what servers host an application determined to be non-responsive or otherwise in a failed state as well as send messages from the restoration service to the appropriate system engineer (e.g., requesting to restore a given application, identifying a host sever that has failed, or identifying the results of the restoration service in attempting to restore a non-responsive application).

The host inventory 732 may specify a collection of host severs and applications monitored by the restoration service. The status data 734 indicates a last known status of applications and servers in the host inventory (e.g., as being functioning as expected, as being non-responsive or otherwise failed, or as being in a maintenance state). The restore scripts 736 provide instructions used to stop, start, or restart a given application or dependent service. As described, the restoration component 722 may restore a non-responsive application by generating a run list of scripts invoked on specific host servers to restore a non-responsive application and/or dependent services.

Note, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements set forth above, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages presented above are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method for restoring a non-responsive application, the computer-implemented method comprising:
    monitoring a plurality of servers hosting a distributed application for unresponsiveness;
    performing a health check on an instance of the distributed application hosted on a first server of the plurality of servers, by attempting a test transaction with the instance of the distributed application;
    determining, based on an analysis of the test transaction, that the instance of the distributed application is in a malfunctioning state, wherein the malfunctioning state indicates the instance of the distributed application is experiencing latency above a threshold;
    determining that the first server is responsive by:
        establishing a shell connection with the first server; and
        receiving a response from the first server via the shell connection; and
    automatically initiating a restoration process, the restoration process including:
        identifying a cause of the malfunctioning state of the instance of the distributed application;
        generating, based on the cause of the malfunctioning state, an upstream profile identifying servers hosting upstream dependent computing services required by the instance of the distributed application;
        generating a downstream profile identifying servers hosting downstream dependent computing services which rely on the instance of the distributed application;
        removing artifacts associated with the instance of the distributed application, wherein the artifacts include at least an open transaction of the instance of the distributed application;
        killing processes associated with the instance of the distributed application;
        restarting the servers identified in the upstream profile thereby restoring availability of the upstream dependent computing services;
        restarting the instance of the distributed application; and
        restarting the servers identified in the downstream profile thereby restoring availability of downstream dependent computing services.

2. The computer-implemented method of claim 1, further comprising starting, stopping, or restarting one of:
    the instance of the distributed application, the downstream dependent computing services, and the upstream dependent computing services.

3. The computer-implemented method of claim 1, further comprising:
    confirming at least one upstream dependent computing service of the upstream dependent computing services is available on a second server of the plurality of servers; and
    restarting the instance of the distributed application on the first server.

4. The computer-implemented method of claim 1, further comprising:
    stopping, on a third server of the plurality of servers, at least one downstream dependent computing service of the downstream dependent computing services; and
    restarting the at least one downstream dependent computing service on the third server after restoring the instance of the distributed application to a responsive state on the first server.

5. The computer-implemented method of claim 1, further comprising determining whether the upstream dependent computing services are available.

6. The computer-implemented method of claim 5, wherein, upon determining that the upstream dependent computing services are not available, scripts are invoked to:

stop the instance of the distributed application on the first server;
restart the upstream dependent computing services; and
start the instance of the distributed application on the first server.

7. The computer-implemented method of claim 1, further comprising:
determining that the first server is not available; and
generating a message indicating the first server has become non-responsive.

8. The computer-implemented method of claim 1, wherein a first one of the downstream dependent computing services comprises one of a web server and a database.

9. The computer-implemented method of claim 1, wherein the first server comprises an instance of a virtual machine (VM) hosted on a cloud computing platform.

10. The computer-implemented method of claim 1, further comprising, confirming neither the distributed application nor the first server has been placed in a maintenance mode state.

11. A computer-implemented method for restoring a non-responsive application, the method comprising:
determining a health status of an instance of a distributed application hosted on a first server, wherein determining the health status of the instance of the distributed application includes attempting a test transaction with the instance of the distributed application;
determining, based on an analysis of the test transaction, that the instance of the distributed application is in a malfunctioning state, wherein the malfunctioning state indicates the instance of the distributed application is experiencing latency above a thresholds;
determining a health status for at least a first upstream dependent computing service required by the instance of the distributed application, wherein the first upstream dependent computing service is hosted on a second server;
upon determining the health status of the first upstream dependent computing service indicates a non-responsive status, determining a health status for the first server and the second server by:
establishing a shell connection with each of the first server and the second server; and
receiving a response from the first server and the second server via the shell connection;
identifying a cause of the non-responsive status; and
upon determining the health status of the first server and the second server indicates the first server and the second server are available, initiating a restoration process to restore the instance of the distributed application to a responsive state wherein the restoration process comprises:
generating, based on the cause of the non-responsive state, an upstream profile identifying servers hosting upstream dependent computing services required by the instance of the distributed application;
removing artifacts associated with the instance of the distributed application, wherein the artifacts include at least an open transaction of the instance of the distributed application;
killing processes associated with the instance of the distributed application;
restarting the servers identified in the upstream profile thereby restoring availability of the upstream dependent computing services; and
restarting the first server thereby restoring availability of the distributed application.

12. A non-transitory computer-readable storage medium storing instructions, which when executed on a processor, perform an operation for restoring a non-responsive application, the operation comprising:
monitoring a plurality of servers hosting a distributed application for unresponsiveness;
performing a health check on an instance of the distributed application hosted on a first server of the plurality of servers, by attempting a test transaction with the instance of the distributed application;
determining, based on an analysis of the test transaction, that the instance of the distributed application is in a malfunctioning state, wherein the malfunctioning state indicates the instance of the distributed application is experiencing latency above a threshold;
determining that the first server is responsive by:
establishing a shell connection with the first server; and
receiving a response from the first server via the shell connection; and
automatically initiating a restoration process, the restoration process including:
identifying a cause of the malfunctioning state of the instance of the distributed application;
generating, based on the cause of the malfunctioning state, an upstream profile identifying servers hosting upstream dependent computing services required by the instance of the distributed application;
generating a downstream profile identifying servers hosting downstream dependent computing services which rely on the instance of the distributed application;
removing artifacts associated with the instance of the distributed application, wherein the artifacts include at least an open transaction of the instance of the distributed application;
killing processes associated with the instance of the distributed application;
restarting the servers identified in the upstream profile thereby restoring availability of the upstream dependent computing services;
restarting the instance of the distributed application; and
restarting the servers identified in the downstream profile thereby restoring availability of downstream dependent computing services.

13. The non-transitory computer-readable storage medium of claim 12, further comprising starting, stopping, or restarting one of:
the instance of the distributed application, the downstream dependent computing services, and the upstream dependent computing services.

14. The non-transitory computer-readable storage medium of claim 12, further comprising:
confirming at least one upstream dependent computing service of the upstream dependent computing services is available on a second server of the plurality of servers; and
restarting the instance of the distributed application on the first server.

15. The non-transitory computer-readable storage medium of claim 12, further comprising:
stopping, on a third server of the plurality of servers, at least one downstream dependent computing service of the downstream dependent computing services; and
restarting the at least one downstream dependent computing service on the third server after restoring the instance of the distributed application to a responsive state on the first server.

16. The non-transitory computer-readable storage medium of claim 12, wherein the operation further comprises:
  determining that the first server is not available; and
  generating a message indicating the first server has become non-responsive.

17. The non-transitory computer-readable storage medium of claim 12, wherein the operation further comprises, confirming neither the distributed application nor the first server has been placed in a maintenance mode state.

18. A system, comprising:
  a processor; and
  a memory containing a program which, when executed on the processor, performs an operation for restoring a non-responsive application executing on a first server, the operation comprising:
    monitoring a plurality of servers including the first server hosting a distributed application for unresponsiveness;
    performing a health check on an instance of the distributed application hosted on the first server of the plurality of servers, by attempting a test transaction with the instance of the distributed application;
    determining, based on an analysis of the test transaction, that the instance of the distributed application is in a malfunctioning state, wherein the malfunctioning state indicates the instance of the distributed application is experiencing latency above a threshold;
    determining that the first server is responsive by:
      establishing a shell connection with the first server; and
      receiving a response from the first server via the shell connection; and
    automatically initiating a restoration process, the restoration process including:
      identifying a cause of the malfunctioning state of the instance of the distributed application;
      generating, based on the cause of the malfunctioning state, an upstream profile identifying servers hosting upstream dependent computing services required by the instance of the distributed application;
      generating a downstream profile identifying servers hosting downstream dependent computing services which rely on the instance of the distributed application;
      removing artifacts associated with the instance of the distributed application, wherein the artifacts include at least an open transaction of the instance of the distributed application;
      killing processes associated with the instance of the distributed application;
      restarting the servers identified in the upstream profile thereby restoring availability of the upstream dependent computing services;
      restarting the instance of the distributed application; and
      restarting the servers identified in the downstream profile thereby restoring availability of downstream dependent computing services.

19. The system of claim 18, further comprising starting, stopping, or restarting one of:
  the instance of the distributed application, the downstream dependent computing services, and the upstream dependent computing services.

20. The system of claim 18, further comprising:
  confirming at least one upstream dependent computing service of the upstream dependent computing services is available on a second server of the plurality of servers; and
  restarting the instance of the distributed application on the first server.

21. The system of claim 18, further comprising:
  stopping, on a third server of the plurality of servers, at least one downstream dependent computing service of the downstream dependent computing services; and
  restarting the at least one downstream dependent computing service on the third server after restoring the instance of the distributed application to a responsive state on the first server.

22. The system of claim 18, wherein the operation further comprises:
  determining that the first server is not available; and
  generating a message indicating the first server has become non-responsive.

* * * * *